(12) United States Patent
Rabines et al.

(10) Patent No.: US 8,156,161 B2
(45) Date of Patent: *Apr. 10, 2012

(54) SYSTEM AND METHOD FOR DISPLAYING DATA ON A THIN CLIENT

(75) Inventors: Rolando Rabines, Boston, MA (US);
Mikhail Dorokhin, Boston, MA (US);
John Doulamis, Boston, MA (US);
Mark Wagner, Boston, MA (US);
Randall Anderson, Boston, MA (US)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/762,799

(22) Filed: Apr. 19, 2010

(65) Prior Publication Data

US 2010/0205206 A1 Aug. 12, 2010

Related U.S. Application Data

(63) Continuation of application No. 11/582,417, filed on Oct. 18, 2006, now Pat. No. 7,702,646, which is a continuation-in-part of application No. 11/253,273, filed on Oct. 18, 2005, now Pat. No. 7,603,358.

(60) Provisional application No. 60/654,667, filed on Feb. 18, 2005.

(51) Int. Cl.
*G06F 7/00* (2006.01)
*G06F 17/30* (2006.01)

(52) U.S. Cl. ........................................ 707/805; 707/955

(58) Field of Classification Search .......... 707/600–831, 707/955; 709/203, 217, 219, 235
See application file for complete search history.

(56) References Cited

U.S. PATENT DOCUMENTS

| 5,179,660 A | 1/1993 | Devany et al. |
| 5,701,461 A | 12/1997 | Dalal et al. |
| 6,269,368 B1 | 7/2001 | Diamond |
| 6,388,683 B1 | 5/2002 | Ishai et al. |

(Continued)

FOREIGN PATENT DOCUMENTS

JP 2003518636 6/2003

(Continued)

OTHER PUBLICATIONS

Simon Lok et al., A graphical user interface toolkit approach to thin-client computing, May 2002, ACM, 718-725.*

(Continued)

*Primary Examiner* — Jean B Fleurantin
(74) *Attorney, Agent, or Firm* — Slater & Matsil, L.L.P.

(57) ABSTRACT

A thin-client user interface includes a user interface and an application server. The user interface is executed on a client device, such as a personal computer having a display. The user interface includes a client application for displaying data. The application server is coupled with the user interface and with a remote database via an electronic data network and is configured to receive a request for data from the user interface, to generate a query request based on the request for data, to access the database and submit the query request to the database, to receive results from the database in response to the query request, and transmit a portion of the results to the user interface.

4 Claims, 5 Drawing Sheets

U.S. PATENT DOCUMENTS

| | | | |
|---|---|---|---|
| 6,647,360 | B2 | 11/2003 | Graham et al. |
| 7,035,912 | B2 | 4/2006 | Arteaga |
| 7,227,921 | B2 | 6/2007 | Butler et al. |
| 7,236,173 | B2 | 6/2007 | Chithambaram et al. |
| 7,386,505 | B1 | 6/2008 | Roth |
| 7,584,172 | B2 | 9/2009 | Heuer et al. |
| 7,689,921 | B2 * | 3/2010 | Rajarajan et al. ............. 715/744 |
| 7,802,231 | B2 | 9/2010 | Baisley et al. |
| 2002/0026495 | A1 | 2/2002 | Arteaga |
| 2002/0158899 | A1 | 10/2002 | Raymond |
| 2003/0097358 | A1 | 5/2003 | Mendez |
| 2004/0075683 | A1 | 4/2004 | Savage |
| 2004/0119753 | A1 | 6/2004 | Zencke |
| 2004/0131020 | A1 | 7/2004 | Smith |
| 2006/0173759 | A1 | 8/2006 | Green et al. |
| 2007/0080958 | A1 | 4/2007 | Chithambaram et al. |

FOREIGN PATENT DOCUMENTS

| | | |
|---|---|---|
| WO | WO 0127812 | 4/2001 |

OTHER PUBLICATIONS

Albrecht., A Comparison of Distributed Groupware Implementation Environments, Jan. 6-9, 2003, IEEE, 9 pp.

Book et al., An Instant Message-Driven User Interface Framework for Thin Client Applications, Sep. 18-22, 2006, IEEE, 257-260.

International Search Report and Written Opinion in PCT/US06/40999, Sep. 25, 2007, 10 pages.

Kensuke Nakamura, Freely Scrolling a Map on the Internet, Nikkei Computer, No. 615, pp. 20-21.

Japanese Office Action for "System and Method for Displaying Data on a Thin Client," 0503-A36396JP, 2011, 4 pages.

* cited by examiner

SYSTEM AND METHOD FOR DISPLAYING DATA ON A THIN CLIENT

CROSS-REFERENCE TO RELATED APPLICATIONS

This application is a continuation of U.S. patent application Ser. No. 11/582,417, filed on Oct. 18, 2006, which is a continuation-in-part of U.S. patent application Ser. No. 11/253,273, filed on Oct. 18, 2005, now U.S. Pat. No. 7,603,358, issued Oct. 13, 2009, which claimed priority to U.S. Provisional Patent Application No. 60/654,667, filed on Feb. 18, 2005, the entire contents of each of which are hereby incorporated by reference.

BACKGROUND OF THE INVENTION

1. Field of the Invention

The present invention relates generally to graphical user interfaces. More particularly, the present invention relates to systems and methods for displaying data on a client interface that allows robust client functionality without requiring substantial local memory, processing resources or network bandwidth.

2. Description of the Related Art

Moore's Law accurately predicted that computational power would increase exponentially over time, and software companies have been eager to develop applications that take advantage of the increasing computer power available. Like processing power, the price and performance of data storage and bandwidth offered in commercial computing devices has been improving rapidly. At the same time, software application architectures have transitioned from large mainframe systems with dumb terminals towards distributed architectures in order to take advantage of the capability of front end devices, such as personal computers.

Personal computers have become so ubiquitous that most companies provide their workers with a dedicated personal computer on their desk to execute business applications. However, as computing devices have become more common place and computing architectures more distributed, it has been increasingly complex and expensive for businesses to maintain their installed software applications.

More recently, advanced networking has allowed a re-birth of centralized architectures, which have been found by some to be easier, less expensive to administer, and less demanding of the end user devices. Ironically, old architectures such as those characterized by mainframes and "dumb" terminals have been reincarnated into today's web server architectures. However, users today expect more functionality from their applications than that which a dumb terminal was ever capable of delivering, and accordingly, proposed systems that lack robust front end functionality have been rejected by users.

In response to this problem, standard web-application architectures have been extended by the concept of a so-called 'smart client', which is capable of delivering a robust user experience. With the smart client architecture, a portion of application functionality is moved to the end user device for execution locally, which takes advantage of the power of a PC desktop. Smart client architectures can be easy to deploy since they often can be administered centrally because client programs can be loaded at start up time. In theory, new versions of the program can be deployed simply by shutting-down and restarting such applications. However, just making the clients smarter does not solve problems with deployment and upgrades.

As computer applications become more sophisticated, hardware upgrades remain expensive since increasingly powerful client devices and infrastructure are required to implement the programs because increased memory consumption, network bandwidth and latency are required.

Investment and financial industry applications are often designed around a grid (spreadsheet-like) component that provides users with the ability to analyze information in a tabular and hierarchical fashion. Such grids are used to compile and aggregate massive amounts of data, such as data relating to stock portfolios. Consequently, for investment applications, the 'grid' has become the biggest consumer of computing resources, and therefore represents the biggest challenge in designing a thin smart client. Thus, there is a need for new and improved systems and methods that solve the above problems and that can deliver a truly thin, yet smart, client application interface.

SUMMARY OF THE INVENTION

The present invention solves a problem with deploying and upgrading increasingly complex investment analysis software. Many organizations can not rapidly adopt new and more powerful applications because they can not afford the cost of the equipment and labor required to upgrade their current infrastructure to provide the additional information processing resources demanded by the new applications. The present invention includes a novel mechanism for allowing the efficient delivery and real time data analysis of server based information onto a client side data grid.

According to some preferred embodiments of the present invention, a thin-client interface system is provided. The system includes one or more interface applications coupled with an application server. The interface applications are executed as remote client devices and include a grid component or object for compiling and aggregating data. The application server dynamically generates query requests in order to provide data to the interface as demanded by the client while limiting the amount of data displayed on the interface in the grid. The application server is configured to receive notification when data in the database is updated and to determine whether the update affects the data displayed in the interface application and, if so, notifies the interface application of the update such that the grid reflects the data update.

According to some preferred embodiments, the system may further include an application repository for maintaining definitions for the interface application configuration and the database schema. The interface application is configured to allow a user to modify the display configuration thereof, such as via appropriate forms, and updates the repository to reflect the user modifications. The application server is configured to access the application repository and to generate dynamic queries based on the definitions of the interface application configuration and of the database in order to populate the interface and grid with data.

According to some preferred embodiments of the present invention, the application repository includes a model of the database and the application server and is configured to determine when a database update affects the current display of the interface based on the model of the database.

According to some preferred embodiments of the present invention, the database includes a relational database management system (RDBMS), and database triggers are utilized to notify the application server, in real time, of updates to the database. Thus, updates to the database are notified to the application server regardless of their origination.

According to some preferred embodiments of the present invention, the interface application is configured to allow the user to define the number of rows that may be stored in memory and displayed in a display grid. The number of rows displayed in the display grid is preferably less than the number of rows to be stored locally in memory. A paging algorithm is provided to control the display of data on the display interface and to cause a new query to be submitted when the interface request data not stored in memory.

Further applications and advantages of various embodiments of the present invention are discussed below with reference to the drawing figures.

BRIEF DESCRIPTION OF THE DRAWINGS

FIG. 1 is a screen shot of a client GUI interface having a grid according to an embodiment of the present invention.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

The invention is referenced throughout this document as a "true" thin client because, unlike other n-tier architectures, the client interface of the present invention remains "thin" regardless of how big the target data set is.

The present invention can be used to monitor and analyze arbitrarily large data sets in single or multi-user shared database environments. Unlike traditional approaches to thin client architectures, the present invention supports a rich and responsive user experience when manipulating very large data sets without requiring proportionally large memory or bandwidth resources in the client front-end device (e.g. user desktop).

Traditional client/server applications are considered to have 'fat' clients because the user devices that host the client application perform most of the processing locally (i.e., on the central processor of the user desktop). In particular, client/server applications are loaded and executed on a client computer, and retrieve the data sets required from server computers (typically hosting a Relational Database Management System (RDBMS)). Clients are considered 'fat' when they need to load and maintain substantial (i.e., 'big') client side programs and/or data sets in order to perform their functions properly. In the client/server world, as program complexity increases or when data set sizes grow, the memory footprint on the client devices increases (i.e., gets more 'fat').

The client/server fat-client approach has two critical shortcomings: first, as new and more powerful applications are deployed, client devices (user desktops) must be upgraded as well as network infrastructure in order to support the increased program and data sizes. In the case of large organizations, this could mean replacing potentially hundreds or thousands of PC desktops; second, even if the memory requirements for an application are unchanged, new versions of the application require reconfiguring individual desktops to use the new version. Accordingly, a substantial investment of information technology (IT) resources could be required to effect in a timely fashion.

The popularity of the Internet web browser promoted the development of n-tier 'thin-client' application architectures (e.g., web enabled applications) as an alternative to traditional 'fat-client' applications. Such n-tier 'thin-client' application architectures address some of the shortcomings in the 'fat' client/server approach. In the n-tier thin client approach, programs are distributed and centrally managed so that only a small portion of the application programs are loaded and executed on the client device. In many instances, this approach allows client side components to be loaded at application start-up time. Moreover, some applications may be able to use HTML, JAVA, or the like to deliver the user interface and as a result, a web browser is the only program needed on the client desktop. However, this approach has the problem that application "screens" are typically served up as static 'documents', similar to regular Internet content and, many business applications do not lend themselves well to a static 'document' delivery approach. For instance, real-time analysis applications require a dynamic interface and a client device smart enough to respond to complex user behaviors.

Attempts are made to pass up n-tier smart client applications as thin client applications by claiming that the client programs are small when loaded onto the desktop at runtime. However, a large amount of data must be subsequently loaded before the application can do anything. True enough, these applications start out thin, but they can get as fat as any 'fat' client from the client/server era.

The present invention provides a "true" thin-client interface that, unlike conventional interfaces, remains "thin" regardless of the size of the target data set of the interface. That is, as described above, previous interfaces typically cache the entire target data set for an interface in local memory in order to provide conventional GUI functionality. As a result, prior art "thin clients" become "fat" in use. However, according to the present invention, a novel system and method are provided that allow the client to display and analyze desired data from a data target and provide robust GUI display functionality, while maintaining a "thin" memory footprint for the interface.

The present invention achieves these and other goals by providing a multi-tier architecture that includes a client application tier capable of providing robust GUI functionality, such as a grid that compiles and aggregates massive amounts of data, an application server tier that dynamically generates query requests in order to manage the amount of data provided to the client tier and to provide real-time updates and pagination thereto, and a database and application repositories tier. The database server preferably utilizes database triggers, stored procedures or the like, to communicate with the application server tier so that the application server can identify when updates to the data have occurred in real-time or near real-time. The application repository maintains client tier configuration information as well as data source information, to which both the client tier and application server have access, and which forms the basis of dynamic queries and data update decisions. As a result of the novel systems and methods provided by the invention, a "true" thin client interface is provided that may have robust GUI functionality including a grid which maintains a small memory footprint on the client device. The present invention is particularly useful in applications that aggregate and analyze massive amounts of data, such as financial computer applications; however, the invention is not limited to such applications.

FIG. 1 is a screen shot of an exemplary GUI interface containing a "grid." This screen shot was taken from MACGREGOR'S XIP® ENTERPRISE COMPLIANCE application. Such compliance monitoring applications allow trading institutions to set up rules and monitor trades, either pre-trade or post-trade, for compliance with the rules. Of course, the use of grids in client interfaces is ubiquitous and the present invention is not meant to be limited to such financial applications.

The exemplary GUI interface 100 as shown includes a display grid to display accounts by portfolio manager (PM) 102. Underneath each portfolio manager 102 heading are displayed detail blocks of information 102a, b, c, corresponding to each account for the portfolio manager. Each detail block 102 a-c includes a listing of the compliance rules for that account. The data displayed in the detail block includes data drawn directly from a relational data base and aggregated or calculated data. For example, the "market value" field is aggregated from a very large data set. As is explained in further detail below, the aggregated data is displayed without loading all the data locally.

GUI interface 100 could be implemented with any number of tools, such as WINDOWS FORMS and FLEX GRID. Further, .NET controls may be used to add functionality to the display. Standard controls can be modified "behind the scenes" to achieve rich control. Such controls allow data to be manipulated on the screen, blocks to be expanded and data to be scrolled, paged-through, etc.

This particular form 100 allows a user to expand or contract each detail block by mouse clicking on the "+" or "−" signs. This functionality is standard to known grid objects. Such a grid component will normally pre-fetch all the data that can be displayed and that is necessary for generating aggregate fields, and keep the entire data set in memory on the client side to be used in handling user interaction, which can create client applications with potentially very large memory footprints (i.e., "fat" clients). In order to avoid this problem, the present invention utilizes an efficient mechanism to maintain enough data on the client side to support a robust display and user experience without having to pre-fetch the complete data set in memory. Further, the present invention provides a mechanism for reflecting real-time updates in the display, even in shared data set multi-user environments.

Figure 2:
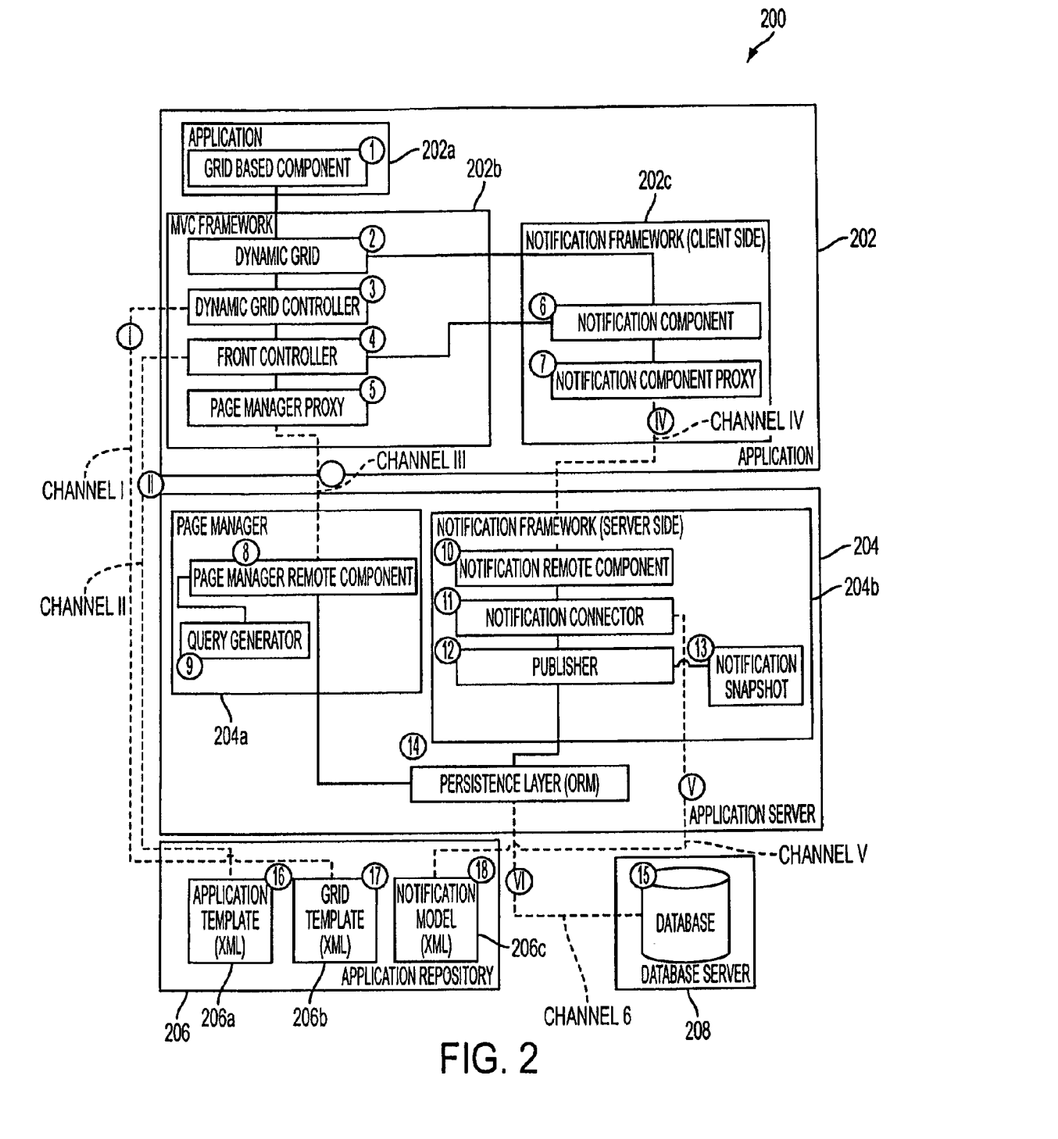
FIG. 2 provides a detailed, component-level description of the grid architecture and the underlying notification mechanism.

FIG. 2 is a component level diagram of architecture 200 for the true thin client interface system according to an embodiment of the present invention. A three-tier architecture includes a client application 202 (e.g., 100), a middle tier application server 204, and a third tier including an application repository 206 and a database server 208.

The application 202 resides locally, for example, on a user desktop, such as a personal computer. Application 202 is configured to access, display and analyze data from database server 208 via the middle tier application server 110 and preferably includes a number of GUI forms for interactive display and analysis. As shown in FIG. 1, the application can include a GUI form having standard grid functionality for displaying aggregated data and the like. The number and makeup of the GUI forms is not critical to the present invention.

Application server 204 is configured to utilize the information in application repository 206 and, in conjunction with application 202, to generate dynamic queries against the database 208 to provide data to application 202 for display and analysis. As is described in further detail below, application server 204 utilizes algorithms and objects to efficiently deliver data sets to application 202 so that application 202 requires only a small memory footprint (i.e., stays "thin") without loss of GUI functionality, and to provide updates in response to user operations (e.g., scrolling, page-up or page-down) or database updates in real-time.

Application repository 206 maintains configuration information relating to application 202 (e.g., user display settings such as grid profile settings, field selection, etc.), data base source definitions of the database 208, and the interrelations between the database and each user display (e.g., each application and grid object). Repository 206 is coupled with both the client application 202 and the application server 204 by an electronic data network. The information may be stored in any appropriate fashion. In one embodiment, three XML documents are maintained that store the definitions: an application template 206a, a grid template 206b, and a model 206c of the database schema. Of course additional templates may be provided.

The application server 204, database server 208 and application repository 206 preferably reside remote from the client application 100, for example, on appropriate server platforms, preferably centralized, and may be accessed via an electronic data network such as a LAN, an open or secure IP network such as the Internet, etc. Communication and messaging between the application 202, application server 204, database server 208 and application repository 206 may be implemented in any format or according to any standard, such as IP, HTTP, etc.

It should be understood by one skilled in the art that, although only a single client application is shown, the present invention is intended for implementation with many clients and indeed, the number of clients is only limited by the performance limitations of the hardware and network used to implement the present invention.

The system of the present invention is characterized by two major features: a dynamic grid subsystem (having client-side and server-side components) that manages data retrieval, display, pagination, etc. and a notification subsystem 202c that identifies real-time updates to data in the database 208, determines if such updates will affect the current display on the client, and, if necessary, updates the client display in real-time to reflect the data updates.

The dynamic grid subsystem implements the paging algorithm and consists of server side services and client side components for the same. These services combine to support a generic grid-like component that can be connected to potentially any data source of any size. The notification subsystem provides real time messaging notification regarding data changes and synchronizes the dynamic grid data with shared database changes.

Components of these two subsystems are preferably efficiently distributed between the client application 202 (client side) and the application server 204 (server side) in order to make the client application 202 as thin as possible and in order make the entire system scalable and easy to maintain. As shown, the application 202 includes client side grid dynamic grid components 202b and 202c, and application service includes a page manager component 204c and a server side notification network 204b.

At application start-up, the client application 202 populates its grid 202a, which may be an available program component such as with WINDOWS FORMS, FLEX GRID, or a .NET control, with data from database 208 according configuration settings stored in the application repository 206. However, the client application 202 does not itself directly query database 208 to populate its grid, which would result in fetching of all data for the grid. Instead, the information regarding how to populate the grid is stored remotely. Such client configuration settings are preferably user configurable.

The application 202 includes a number of modules, a grid based component 202a that is the front end user interface container for the grid, a Model-View-Controller (MVC) framework 202b for controlling the grid, and a client side notification framework 202c for handling data update notifications. The MVC framework 202b includes a dynamic grid control (2), which implements grid functionality and may be based on commercially available control, such as COMPONENTONE FLEX GRID control. The dynamic grid controller (3) performs the controller role in MVC pattern. The grid preferably hosts one page of data and pagination is controlled.

The dynamic grid controller (3) is configured to read grid template 206b in the application repository 206, connect the dynamic grid control (2) to the application server and to provide interoperability with data source services. The dynamic grid controller uses notification component (6) and notification component proxy (7) of the notification subsystem 202c for getting notification updates.

The front controller (4) is a singleton object in scope of the application 202 and is configured to provide interoperability across the application components. The front controller (4) dynamically binds application requests to server side services. The front controller (4) loads the application template 206a in order to dynamically bind the particular service to its location at run time.

Page manager proxy (5) represents a regular C# class, which communicates with the page manager remote component (8) API of the page manager 204a of the application server 204, and acts as a proxy for the page manager remote component (8). This proxy is responsible for transferring a client request to an appropriate remote service through electronic network (e.g., HTTP channel (III)).

The application server 204 includes a page manager module 204a, a server side notification framework 204b, and a persistence layer (ORM) 204c. Page manager module 204a includes a page manager remote component (8) that implements a stateless component, which provides data reading/writing API for the dynamic grid. The page manager remote component (8) uses a built-in query generator (9) in order to produce a request for data to the persistence layer (14) in an executable query format language such as SQL. Persistence Layer (14) is a set of classes which defines ORM like interoperability with underlying database 208.

As shown in FIG. 2, the page manager proxy (5) of the dynamic grid subsystem 202b communicates with the page manager component 204a of the application server 204 in order to request data to be displayed. The grid template 206 defines the data source names (database table or view), fields (columns), grouping, aggregation and other functions, field visibility and other display information. The queries that are generated define what data are to be displayed (type) as well as the number of rows that are needed from the corresponding dataset (range). The range is preferably dynamically configurable at run-time and allows for the pre-fetching of additional rows outside the current visual range, which adjusts the client memory footprint depending on the amount of memory available on the client side.

The query generator dynamically executes a query against database 208 based upon the template 206b for the active grid. The grid component 202a displays the results of the query.

Additional data may be preloaded so that it may be accessed to update the display when a user performs display operations such as scrolls through data in the grid. Preferably, the amount of data preloaded or coded does not substantially exceed the amount to be displayed. When a scrolling operation request data that is not preloaded, the dynamic grid controller (3) recognizes this request and communicates with the page manager 204a of the application server 204 to perform a dynamic loading operation to load the next set of relevant data. This function is shown and described below with reference to FIG. 3.

Aggregated data to be displayed may also be fetched in sets. For example, if data fetch size has been set to 60 rows, this includes the rows of data on the lowest aggregation level (plain rows) plus all aggregated rows. Thus, the real amount of data fetched from the data source may be equal or less than the fetch size because aggregation rows are generated "on the fly." The set of data that gets displayed is called the "visual range" of the client, and the total data prefetched by the client is called the "actual" range. The visual range can be different from the "actual range" that was fetched based on the generated query.

The "actual range" is configurable through the grid template 206b and is the set of data, which potentially can be visible without having to re-query data. If the actual range is defined to be equal to the visual range, then all the data fetched from the server becomes visible in the grid. If any aggregated row is collapsed, the system does not fetch the individual rows that compose this aggregate. The grid displays aggregated rows to provide the appropriate visual effect. Thus, collapsed aggregated rows do not consume proportional memory footprint on the client side. Additional queries can be generated and executed dynamically when the user expands an aggregate row.

User-initiated configuration changes can require modification to the dynamic query that results in the current grid content. For example, aggregation levels or fields in the display area could be added or removed requiring additional or updated data. When such user-initiated configuration changes occur, the dynamic grid controller (3) communicates with the page manager 202 to dynamically update the query that controls the data cached by the grid and refresh the query results.

Figure 3:
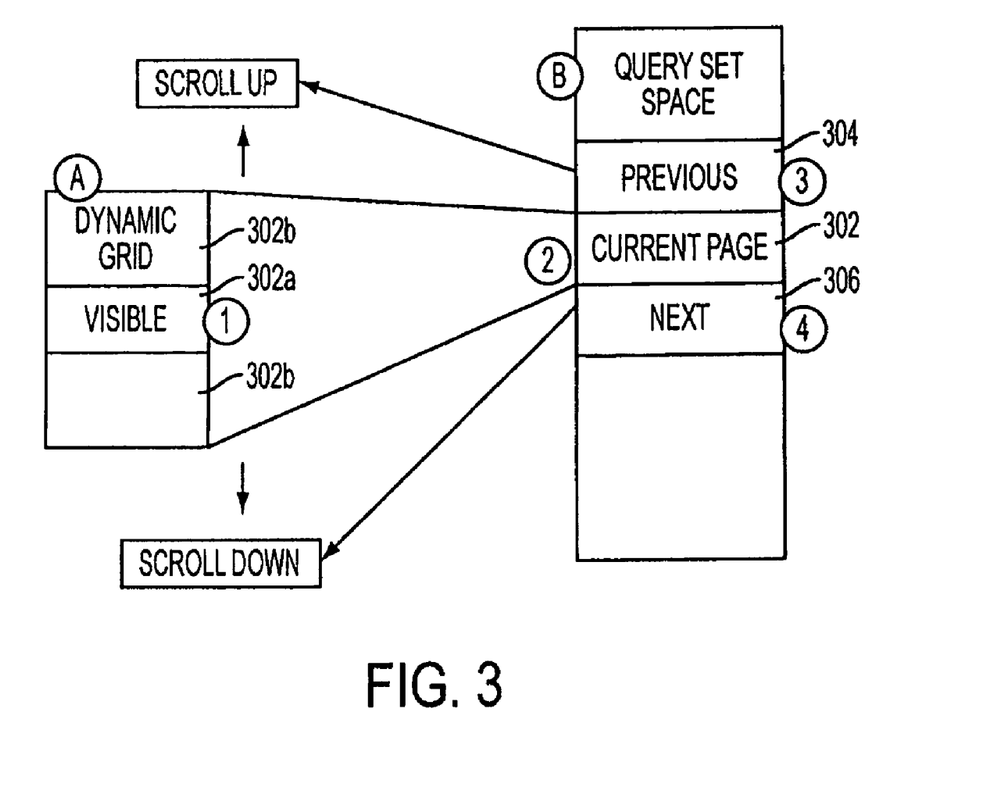
FIG. 3 illustrates a paging algorithm according to an embodiment of the present invention.

The paging mechanism is explained by way of example with reference to FIG. 3. The current page 302 represents the actual range of data fetched from the database 208 and kept actively in memory. The visible range of data 302a is only a subset of the fetched data and is defined by the grid viewer configuration. Well known GUI functions such as Scroll UP and Scroll DOWN operations cause the visible range of data to move. Data outside the visible range but in the actual range can be immediately displayed by the grid function without accessing the database. However, when GUI operations require display of data outside the actual range, a query request is made that replaces the actual range with a new data set based on the request.

As shown in FIG. 3, in terms of the entire query set 300 that is the entire target data set for the grid, when scrolling UP on the grid display beyond the topmost row of the actual range, the Previous Page 304 portion of data is set to the Current Page 302 by dynamic query execution. Likewise, Scrolling DOWN beyond the last row of the actual range will fetch the Next Page 306 portion of data and set that to the Current Page 306.

The actual range of data for a client grid is preferably set to be larger than the visible range. In order to load data to the grid for display, the position of the first row in the result set must be identified. The actual range can be expressed as a number of rows, the direction of scrolling (down/up) and the collapsed row definitions (aggregations), if applicable.

Take, for example, the case that an exemplary client grid has 50 rows as the actual range size and no collapsed rows to start. Grid operations may be processed as follows:

Initialization—Start position=0, Actual Range=50, Scrolling=down.
   Removes all data rows.
   Set row count=Actual Range.
   Going from top to bottom populate data.
Read next page—Start position=ID of last row in Visual Range, Actual Range=50, Scrolling=down.
   Operate with two Actual Ranges (old and new).
   Cut off all rows UP from last visible row in Visual Range.
   Move the rest of Visual Range to top of the grid area.
   Add new Actual Range to the bottom of Visual Range.
   Cut off rows DOWN after Actual Range size.
   Visual Range starts from first row of Actual Range.
Read previous page—Start position=ID of first row in Visual Range, Actual Range=50, Scrolling=up.
   Operate with two Actual Range (old and new).
   Cut off all rows DOWN from first visible row in Visual Range.
   Move the rest of the Visual Range to the bottom of the grid area.
   Add new Actual Range to the top of Visual Range in reverse order.
   Cut off rows UP after Actual Range size.
   Visual Range finishes on last row of Actual Range.
Scroll down in Visual Range.
   If there is data in Actual Range below of last row in Visual Range than move Visual Range down.
   If bottom of Visual Range "is going below" Actual Range—read next page (see above).
Scroll up in Visual Range.
   If there is data in Actual Range above of first row in Visual Range then move Visual Range up.
   If top of Visual Range "is going above" Actual Range— read previous page (see above).
Collapse.
   Add collapse data to grid collapse collection.
   Remove all rows from Actual Range below collapsed node.
   Load data as from collapsed row below (scrolling down).
   Add new data to the bottom of Actual Range. It could require collapsed node simulation. The result set has gaps where collapsed data is supposed to be because Page Manager excludes invisible (collapsed) rows.
   Cut off all rows below Actual Range size.
Expand.
   Remove expand node data from grid collapse collection.
   Remove all rows from Actual Range below expanded node.
   Load data as from expanded row below (scrolling down).
   Add new data to the bottom of Actual Range.
   Cut off all rows below Actual Range size.

In the simple example of a large record set where each record is keyed by unique number, if the record set has 10,000 records, assume that the first row has number 1 and the last record has number 10,000. In order to fetch the first page of 50 rows, the paging system would generate a query such as:

```
SELECT TOP 50 * FROM <data source> WHERE RowID > 0
   ORDER BY RowID
```

When a user scrolls down beyond row with number 50 the system should fetch a second page of the record set, which can be done by a query such as:

```
SELECT TOP 50 * FROM <data source> WHERE RowID > 50
   ORDER BY RowID
```

Being on page 2 with actual range of rows from 51 to 100, the user can then scroll down beyond row with number 100, and the system fetches third page of data using the same query. For example, if the grid has actual range or rows from 101 to 150 (third page) and the user scrolls up above of row with number 101 the system should fetch second page. This could be done by a query such as:

```
SELECT TOP 50 * FROM <data source> WHERE RowID < 101
   ORDER BY RowID DESC
```

Some Relational Database Systems (such as Microsoft SQL Server 2000) do not provide unique numbers for generic queries. Thus, unique numbers must be provided "on the fly" using SQL. Moreover, such numbering is needed to integrate two additional factors: Aggregation (grouping) and Sorting.

All the queries in the above examples show how to select plain data from data source, but they do not illustrate handling of aggregated data. In most investment analysis applications, aggregates can be arbitrary, and thus, the aggregation data can not be simply pre-computed and maintained in the data source. The system must extract the necessary information from a grid configuration template and generate a special query that can produce the aggregate data "on the fly." For example, the GROUP BY clause can be used to calculate aggregated data (values, rows). Also, the WITH ROLLUP clause can be used to produce rollup rows.

In the case where the data set is supposed to have two levels of aggregates—first level is Account Code and second is Security Code, the defined hierarchy has two levels, and in order to produce the aggregated data the query will be constructed like the following:

```
SELECT <some fields> FROM <data source>
   GROUP BY Account Code, Security Code WITH ROLLUP
```

If the data set includes portfolios with names Account1 and Account2, and corresponding portfolio positions like Account1:Security1, Account1:Security2 and Account2:Security3 then the query above could generate a hierarchy such as:
   Account1
      Security1
      Security2
   Account2
      Security3

Using GROUP BY WITH ROLLUP generates both levels (account and security). Using this approach it is possible to generate a hierarchy for any aggregation level.

In the case that every aggregation row can also be supplied with unique RowID that could be generated on the fly, it becomes important that the aggregation Row IDs be sequentially correct with respect to data source Row IDs. In order to use data in the grid the final record set should appear as follows:

Account1
  Security1
    Account1, Security1, <primary ID>, <some values>
    Account1, Security1, <primary ID>, <some values>
  Security2
    Account1, Security2, <primary ID>, <some values>
    Account1, Security2, <primary ID>, <some values>
    Account1, Security2, <primary ID>, <some values>
Account2
  Security3
    Account2, Security3, <primary ID>, <some values>
    Account2, Security3, <primary ID>, <some values>

The third level in this hierarchy may be represented by plain records from data source. If the result set has sequential numbers for every row, the query scheme proposed above can be used. Adding some RowIDs to the hierarchy above will result in the following:

```
Account1                                                100000
  Security1                                             101000
    Account1, Security1, <primary ID>, <some values>    101010
    Account1, Security1, <primary ID>, <some values>    101020
  Security2                                             102000
    Account1, Security2, <primary ID>, <some values>    102030
    Account1, Security2, <primary ID>, <some values>    102040
    Account1, Security2, <primary ID>, <some values>    102050
Account2                                                 20000
  Security3                                             203000
    Account2, Security3, <primary ID>, <some values>    203060
    Account2, Security3, <primary ID>, <some values>    203070
```

As can be seen, the row codes (RowID) have sequential order, and it means that if the following query is used:

```
SELECT TOP 50 FROM <data source> WHERE RowID > 2030
ORDER BY RowID
```

50 rows are returned after row with ID=2030.

The desired result shown above can also be produced by combining two different queries. The first query returns plain data from data source, and the second query returns aggregated data (grouped by). The UNION SQL operator can be used to dynamically merge these two results. The following query merges plain and aggregated data using the example.

```
SELECT TOP 50 [SOURCE].* FROM
(
    SELECT RowID, <some fields> FROM <data source>
    UNION
    SELECT RowID, <some fields> FROM <data source>
    GROUP BY Account Code, Security Code WITH ROLLUP
) AS SOURCE
ORDER BY 1
```

Note that the TOP attribute can be applied to merge the query result. Note that the RowID column is not retrieved from the data source. The RowIDs are generated as part of the query through different algorithms for every field. For the query that returns plain data, the RowID was generated by using the following algorithm:

```
CONVERT(binary, isnull(AccountCode, 0x0)) +
CONVERT(binary, isnull(SecurityCode, 0x0)) +
CONVERT(binary, -1)
```

For the second query the IDs were generated by the following function:

```
CONVERT(binary, isnull(AccountCode, 0x0)) +
CONVERT(binary, isnull(SecurityCode, 0x0)) +
CONVERT(binary,
    CASE WHEN GROUPING(AccountCode) = 0 THEN 1
    ELSE 0 END +
    CASE WHEN GROUPING(SecurityCode) = 0 THEN 1
    ELSE 0 END)
```

According to an embodiment of the present invention, a key feature of the thin client grid is that it is capable of supporting an arbitrary data set and grid display configurations including "on the fly changes" by the user. In the present invention, the properties of a dynamic grid are determined through two elements: Data Source and Grid Template. The Data Source determines the contents of the SELECT query (the FROM clause). Valid data sources include any database table, database view or user defined function which returns a record set. All data source types must be capable of returning (generating) a unique row ID of type BINARY and column name UKey.

The following is an example of a database view which joins two tables and generates unique row ID:

```
SELECT
    CONVERT(binary(15), b.TaxLotID) AS UKey,
    a.AccountCode, a.ShortName,
    b.TaxLotID, b.SecurityCode, b.Quantity
FROM Account a
INNER JOIN TaxLot b ON a.AccountCode = b.AccountCode
```

In this example, TaxLotID is the primary key of the underlying TaxLot table, and it is unique across this record set.

The Grid Template 206b preferably includes well formed XML file(s), which references the data source and defines initial column order, readable column headers, column width, initial sorting and any extra operations the system has to execute on the fly like grouping and aggregation calculations.

Example syntax of the template can be as follows:

```
<?xml version="1.0" encoding="utf-8" ?>
<GridView table="<table | view | :user defined function>">
    <Fields>
        <Field name="<column name in data source>"
            type="<varchar | int | float | ...>"
            function="<count | avg | sum | min | max>"
            group="<on>"
            header="<column header>"
            width="<width in pixels>"
            tlb="<object name>" fld="<object property>"
```

```
            readOnly="<false | true>"
            visible="<false | true>"
            sort="<false | true>" />
        ...
    </Fields>
</GridView>
```
Where:
The GridView element defines the reference to data source.
    table - table name, view name or function name.
Every Field element defines one column in the Dynamic Grid.
    name - reference to the field in data source.
    type - column data type. It can be any recognized database type.
    function - aggregation function. Any one of five aggregation functions: count, avg, sum, min and max. This attribute can be empty or omitted.
    group - grouping flag. This attribute can be empty or omitted.
    header - string column header.
    width - initial column width in pixels.
    tlb - table name which provides the value for this column (required only for editable column).
    fld - field name which provides the value for this column (required only for editable column).
    readOnly - editable flag. If this attribute is true, empty or omitted the column is read only.
    visible - visibility flag.
    sort - default sort flag (only one column may have this flag true).

If a database view is provided, for example, with the name AccountMonitor, defined by the SQL statements above, then an appropriate Grid Template may have following form:

```
<?xml version="1.0" encoding="utf-8"?>
<GridView table="AccountMonitor">
    <Fields>
        <Field name="AccountCode"
            type="varchar" function=" "
            group="on" header="Account" visible="false"
            tlb="Account" fld="AccountCode" />
        <Field name="TaxLotID"
            type="int" function="count"
            group=" " header="TaxLot ID" visible="true"
            tlb="TaxLot" fld="TaxLotID" />
        <Field name="SecurityCode"
            type="varchar" function=" "
            group=" " header="Security ID" visible="true"
            tlb="TaxLot" fld="SecurityCode" />
        <Field name="Quantity"
            type="float" function=" "
            group=" " header="QTY" visible="true"
            tlb="TaxLot" fld="Quantity"/>
    </Fields>
</GridView>
```

The Grid Template 206b preferably describes how to show data and what calculations have to be done.

There is also preferably a Grids section in the Application Template 206a where one would has to add a new reference to activate the grid component. Assume that the template above as file AccountMonitor.xml in the application repository:

```
<Grids>
    <Grid name="AccountMonitorGrid." Then
AcountMonitorGrid should be associated with AccountMonitor .xml in
application template (16) as: "xml="AccountMonitor.xml"/>
    ...
</Grids>
```

Then the method Initialize in the grid component controller will load the template as follows:
    ViewUrl=FrontController.GetGridUrl("AccountMonitorGrid");

Most investment analysis applications must be deployed in a shared database multi-user environment. In such an environment, different users could be writing and reading from the same database, often modifying and analyzing overlapping data sets. Such data updates may come from a variety of front-end tools. In order to preserve the integrity of the analysis provided by the client interface application, the system must be able to when changes to the underlying data occur that affect a client interface application and notify that particular client interface application of the relevant updates to their underlying data set. The present invention maintains the integrity of the contents in real-time via a notification subsystem.

The notification subsystem includes a set of objects and algorithms that allows efficient generation of notification data when underlying data impacts a client interface and propagates the notification data to the client interfaces.

Reference is made to FIG. 2 when describing the structure and operation of the Notification System.

The Notification System consists of a number of components: Notification Framework (202c and 204b) defines a set of components for client connectivity, channel transport, subscription and notification messaging. Notification Component (6) connects the application to the notification system. Notification Component Proxy (7) implements Notification interface and transfers client's calls to remote object.

Notification Remote Component (10) establishes connection point of the notification system with clients, on server side. This object may be available, for example, through .NET REMOTING. Notification Connector (11) implements and exposes main notification interface. Publisher (12) regular class provides asynchronous publishing cycle.

Notification Model 206c includes the Subscriptions and Database notifications snapshot at the time the Publisher was created. It is a set of objects and algorithms that allows efficient generation of notification data and propagates it to the subscribers. Notification Model 206c preferably comprises an XML file which defines interrelations between Grid and database tables.

Database publishing mechanism (not shown) is set of database tables, triggers and stored procedures related to Notification System. This mechanism allows outside of database components to be informed about data changes.

Database tables can send primitive notifications through a database Trigger, which is responsible for mirroring the primary key data of changed records in NSMessage table. The trigger only copies some modified data to the NSMessage table.

The NSMessage table can have the following format:

| Field | Type | Length | Identity | Description |
| --- | --- | --- | --- | --- |
| MessageID | Int | | Yes | Unique ID |
| Active | Int | | | 0 - message was picked up by publisher (pending), 1 - message is waiting for publish |
| DbObject | Varchar | 50 | | Table name |
| DbAction | Char | 1 | | I—Insert, U—Update, D—Delete |
| PrimaryKey | Varchar | 2500 | | Comma separated primary key (see description) |
| PublisherID | Char | 32 | | Publisher ID is used by Publisher instance |

Whereas:
MessageID is the identity field.

Active has default a value 1. When the record is created this value indicates that the message is ready to be published. The Publisher (12) picks up messages with Active flag equal 1, and updates this flag to 0. This means the message is pending—in process of publish. The Publisher is responsible to remove published primitive notification messages or restore Active flag to 1 if the publish process failed.

DbObject contains database table name.

DbAction defines what database operation corresponds to this record.

PrimaryKey contains comma separated primary key data:

```
<Field Name>, <Field Type>, <Field Value>
[,<Field Name>, <Field Type>, <Field Value>]
```

PublisherID is a randomly generated Id which is the Publisher identifier. The Publisher instance can recognize primitive messages that it published.

The Notification Trigger can be defined as INSERT/UPDATE/DELETE type has and can be implemented as follows:

```
CREATE TRIGGER [<table name>_Notification] ON [<table name>]
FOR INSERT, UPDATE, DELETE
AS
DECLARE
    <variables for primary key>
SELECT @action = <define trigger type>
<if the trigger is called by delete operation>
    DECLARE Delta_<table name>
        CURSOR FOR Select <primary key> FROM deleted
<if the trigger is called by insert or update operation>
    DECLARE Delta_<table name>
        CURSOR FOR Select <primary key> FROM inserted
OPEN Delta_<table name>
<loop through cursor>
    <compose comma separated primary key>
    INSERT INTO NSMessage(DbObject, DbAction, PrimaryKey)
        values( <table name>, @action, <comma separated primary
        key> )
<loop end>
CLOSE Delta_<table name>
DEALLOCATE Delta_<table name>
```

One purpose of the Notification Model 206c is to generically define the interrelations between database tables and grid data sources. The Notification Model 206c allows one to create 1-to-many relationships for the Grid notification element. The syntax of the Notification Model for Grid definition can be, for example:

```
<?xml version="1.0" encoding="utf-8" ?>
<NotificationSchema notificationCheck="<notification period>">
    <NSObjects>
        <NSObject name="<grid data source>">
            <DomObjects>
                <DomObject><database
                    table name></DomObject>
                <DomObject><database
                    table name></DomObject>
                <DomObject>...</DomObject>
            </DomObjects>
        </NSObject>
    </NSObjects>
</NotificationSchema>
```

The NotificationSchema element can define a single attribute of type integer. It determines what is the period of time (in seconds) the system enforces for checking primitive database notifications.

The NSObjects element can define a set of notification objects (Grid) where every NSObject can define one notification object (Grid). There can be a nested set of DomObjects for every NSObject, which enumerates collection of database objects (tables) the grid is related to. Here is example of Notification Model definition for the example grid:

```
<?xml version="1.0" encoding="utf-8" ?>
<NotificationSchema notificationCheck="20">
    <NSObjects>
        <NSObject name="AccountMonitor">
            <DomObjects>
                <DomObject>Account</DomObject>
                <DomObject>TaxLot</DomObject>
            </DomObjects>
        </NSObject>
    </NSObjects>
</NotificationSchema>
```

This example defines a grid which is based on the AccountMonitor database view. This grid will be notified of changes in both the Account and TaxLot tables.

In an embodiment of the present invention, the Notification Component (6) can be a client side notification API implementation which hosts the Notification Component proxy (7). The Notification Component object can be instantiated by the Front Controller as a singleton. The Notification Component can implement client side subscription API from the component point of view, and also provide routing of the incoming notification messages to the final recipient (grid component).

Notification Component (6) can also implement a bidirectional client side multi protocol transport channel. The Notification Component can use a standard HTTP or TCP channels (IV) in order to connect to the server side party.

Notification Remote Component (10) can implement a bidirectional server side multi protocol channel, using standard HTTP or TCP channel protocol.

Notification Connector (11) can be used by subscribers and publishers in order to communicate with each other. The Notification Connector (on a timer basis) instantiates Publisher object (12) to perform publishing cycle. The Notification Connector is created upon first request to the Notification System, after the single instance of the Notification Connector exits it is shared by all requests. Notification Connector loads Notification Model (206c) using a regular HTTP request (V).

Notification Model (206c) may be implemented through an XML file, which defines interrelationships between database tables (primitive objects) and grids (business objects). The Notification Model allows for dynamically defining 'notifiable' objects in the domain model.

Publisher (12) is the object which determines notification cycle using Notification Snapshot (13). The Publisher generates messages which the system has collected since last time Publisher was called (Publisher is instantiated by Notification Connector on a timer basis). In order to retrieve updates from database the Publisher instantiates Persistence Layer objects (14).

Notification Snapshot (13) can be built by the Publisher instance in order to find the correlation between primitive database data changes and subscriptions which exist in the system by the time the snapshot is created. It also provides an efficient algorithm for loading updated data from database and pushing notification messages to the clients. The Notification Snapshot is fed by data that comes from Notification Model and subscription snapshot (subscriptions which are defined in the system) on one side, and primitive database update messages from another side. Finding correlations between these data entities is the purpose of the Notification Snapshot. Persistence Layer (14) loads state updates from the database (15).

Figure 4:
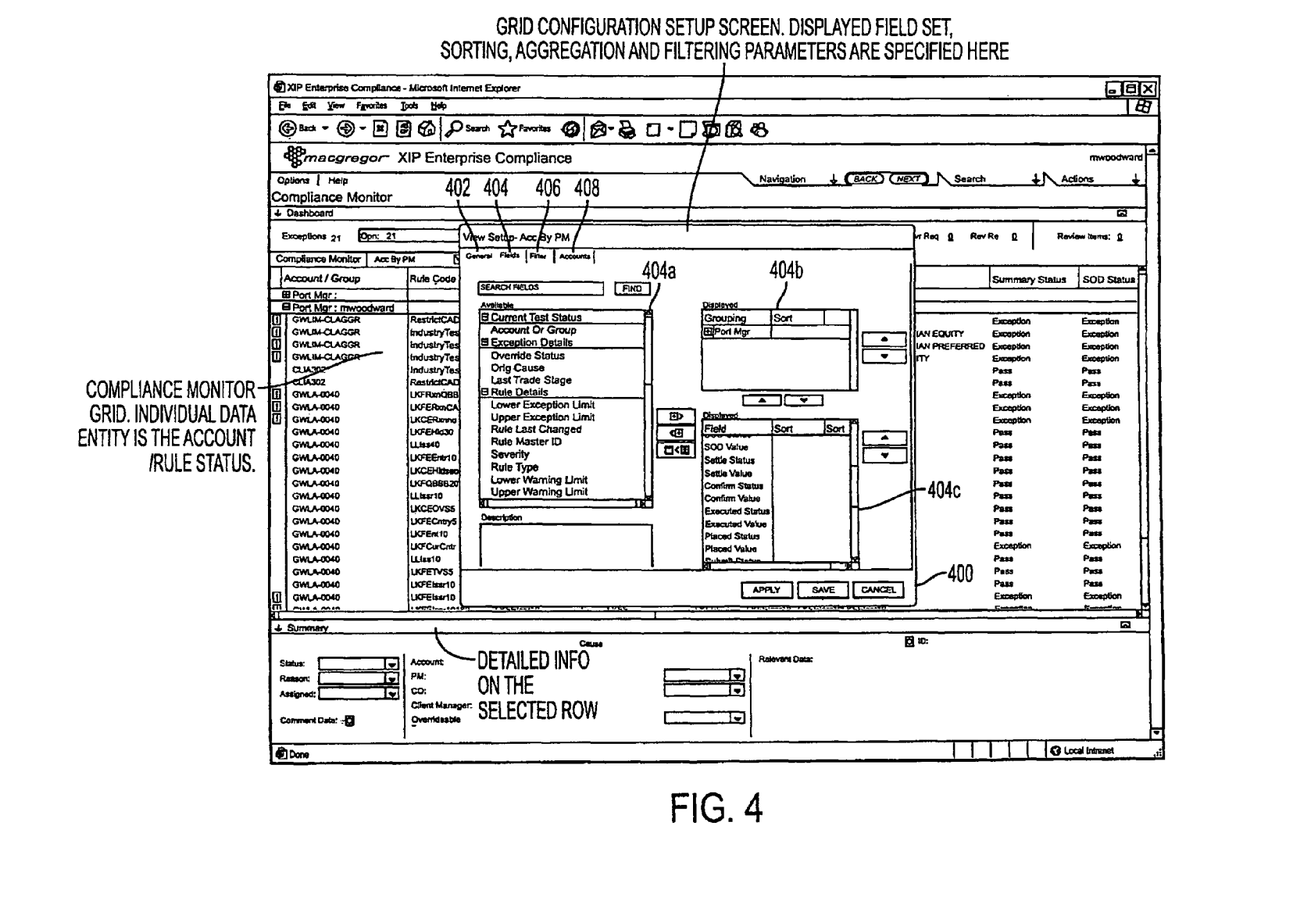
FIG. 4 illustrates a setup screen that collects user-driven configuration parameters.

FIG. 4 is a screen shot of a great configuration setup screen 400, which allows the use of setup parameters with respect to the display of the grid. For example, setup screen 400 without the use of general setup configuration 402, field configuration 404, filtering parameters 406, and account information 408. As shown, the form includes tab-style navigation to navigate between setup sub-screens 402-408. The FIELDS sub-screen 404 is shown in FIG. 4. Available fields are listed in block 404*a* can be dragged and dropped to display box 404*c* or to display block 404*b* which allows for grouping. Individual attributes may be adjusted as well. Preferably, the user configuration information is stored in one or more templates in the application repository.

Figure 5:
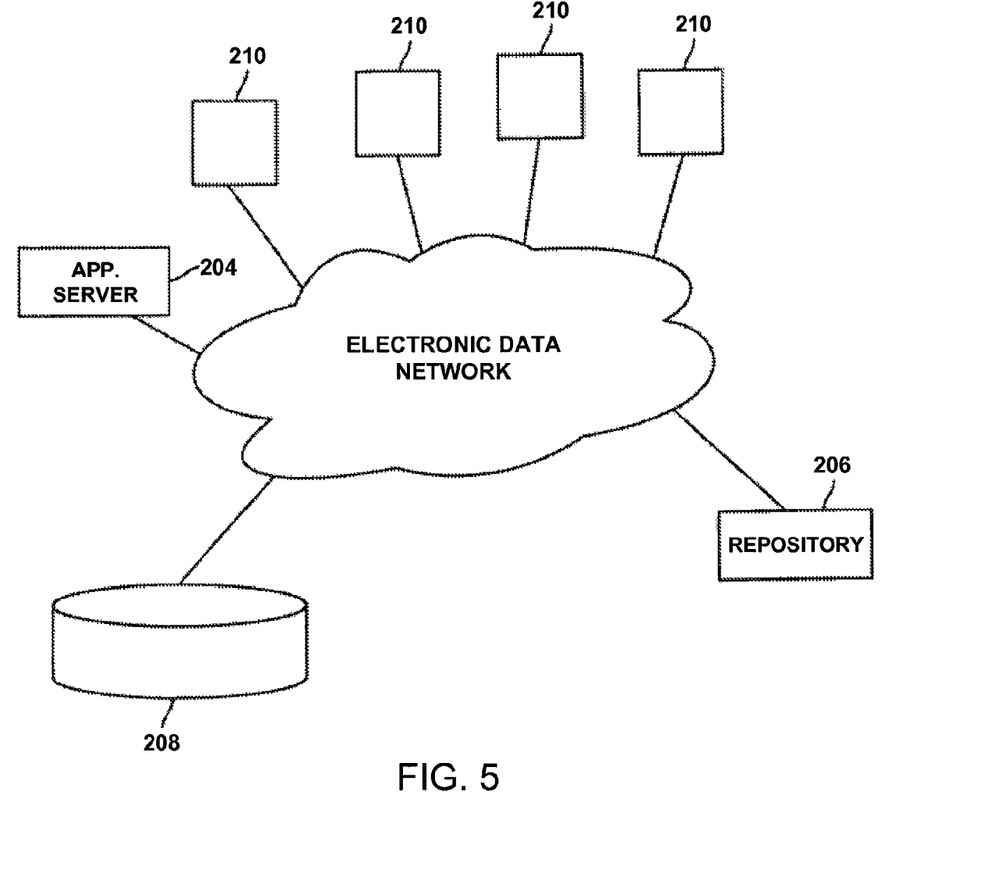
FIG. 5 is a block diagram of a system according to an embodiment of the present invention.

FIG. 5 is a block diagram of a system according to an embodiment of the present invention. The system may include one or more user client devices 202 executing a user application as already described above. Each client 202 is coupled with an electronic data network. Application server 204, repository 206, and a database 208 are also coupled with an electronic data network and function as already described above. The electronic data network may include any number of secure or proprietary data networks, open networks such the internet or combination thereof.

Each of devices 202, 204, 206, and 208 may be implemented by one or more physical devices such as computer processors, personal computers, stackable processing units, server devices, etc. outfitted with appropriate operating systems and other software for performing functionality described herein. Communication devices may be facilitated by known networking means such as HTTP messaging, Ethernet protocol, etc. The invention is not intended to be limited in any fashion to the configuration shown in FIG. 5.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

We claim:
1. A thin-client user interface, comprising:
a) a user interface that is executed on a client device having a display, for displaying data to a user on the client device;
b) an application server coupled with said user interface and with a remote database via an electronic data network and configured to receive a request for data from said user interface, to generate a query request based on said request for data, to access said remote database and submit said query request, to receive query results from said remote database in response to the query request, and to provide a portion of said query results to said user interface;
wherein said client device is configured to perform an analysis function on said portion of said query results and to display analysis results of said analysis function;
wherein said application server is configured to identify when updates to data in said remote database affect said analysis results of said analysis function at the client device and to access said remote database and resubmit said query request, to receive query results from said remote database in response to the query request, and to provide a portion of said query results to said user interface;
further comprising a remote application repository coupled with said client device and said application server via said electronic data network, said application repository configured to maintain data relating to said client device configuration, said database configuration, and
interrelations between said client device configuration and said database configuration.

2. The thin-client user interface as recited in claim 1, wherein said user interface is configured to display only a first range of data that is a subset of the portion of said results provided by said application server, and in response to a user operation requesting display of additional data, displays a second range of data that is a subset of the portion of data said results provided by said application server.

3. The thin-client user interface as recited in claim 2, wherein said first and second range of data are contiguous.

4. The thin-client user interface as recited in claim 2, wherein said client device is further configured to, in response to a user operation request for display of data outside of said portion of said results provided by said application server, transmit a request for additional data to said application server, and said application server is further configured to generate a query request based on said request for data, to access said database and submit said query request, to receive results from said database in response to the query request, and to provide a portion of said results to said user interface.

* * * * *